UNITED STATES PATENT OFFICE.

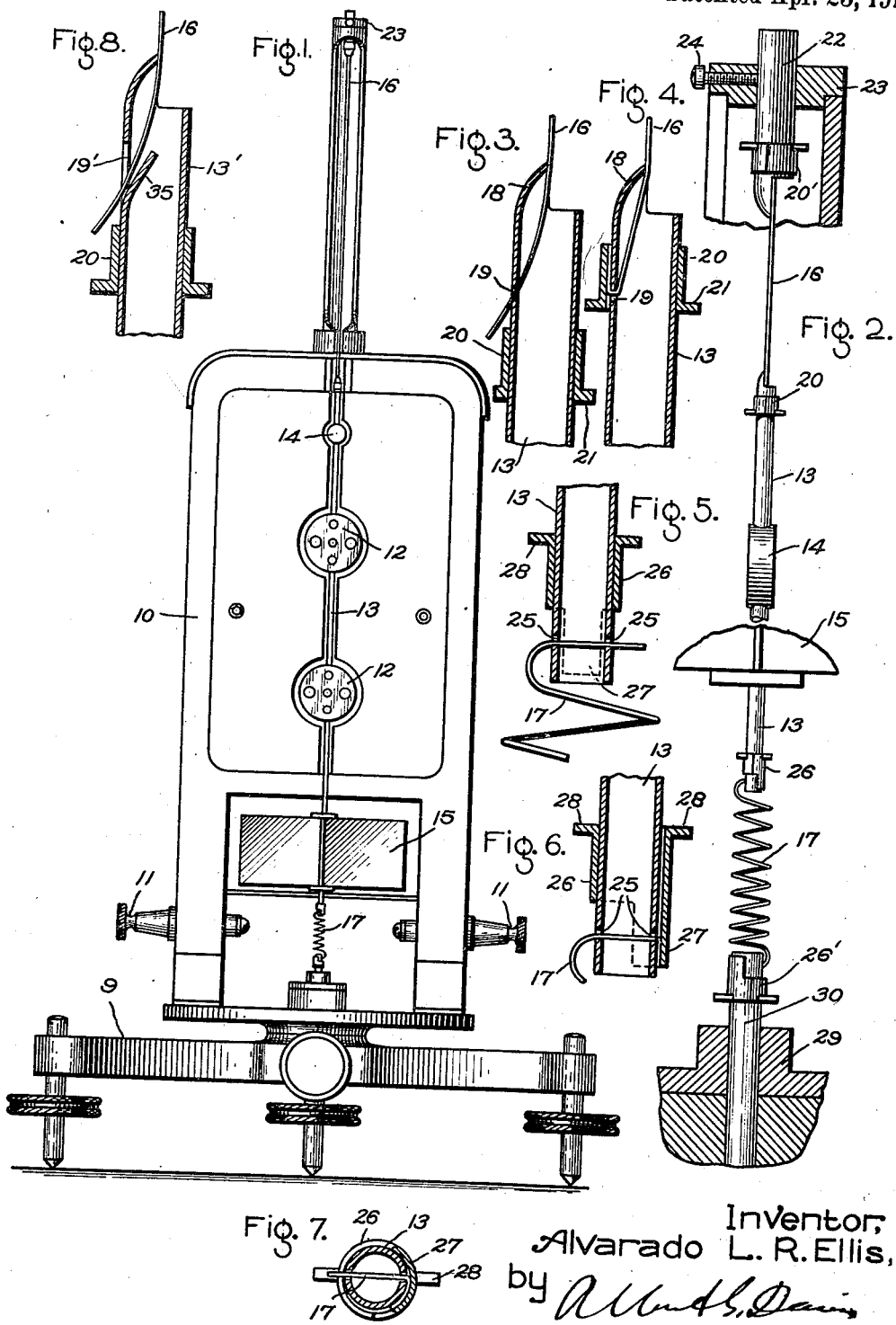

ALVARADO L. R. ELLIS, OF LYNN, MASSACHUSETTS, ASSIGNOR TO GENERAL ELECTRIC COMPANY, A CORPORATION OF NEW YORK.

ELECTRICAL MEASURING INSTRUMENT.

1,263,393.

Specification of Letters Patent. Patented Apr. 23, 1918.

Application filed April 24, 1915. Serial No. 23,586.

*To all whom it may concern:*

Be it known that I, ALVARADO L. R. ELLIS, a citizen of the United States, residing at Lynn, county of Essex, State of Massachusetts, have invented certain new and useful Improvements in Electrical Measuring Instruments, of which the following is a specification.

My invention relates to electrical instruments and particularly to electrical instruments in which the movable element has a filar suspension, for example reflecting galvanometers and similar instruments. My invention more especially relates to means for conveniently fastening the filar suspension in such instruments to the moving element and to a relatively fixed part of the instrument. Heretofore, it has been generally customary to solder the filar suspension to the shaft of the moving element and to its supporting member in the instrument. This is an extremely delicate operation, and numerous difficulties arising from the sensitiveness of the parts in question and from the characteristics of the instrument have been encountered. By my present invention, I propose to eliminate any soldering operation and to clamp the filar suspension to the moving element and to its supporting member in the instrument. The object of my invention is then to provide a novel and improved clamping means for securely and satisfactorily fastening the filar suspension of the movable element of an electrical instrument to its coöperating parts. It will be recognized by those skilled in the art that a satisfactory clamp for this purpose must pull away from a definite point, and must not shift, that is, it must be absolutely positive in its action to prevent slipping and similar objectionable changes at the operative points of connection of the suspension. The clamping device of my present invention consists of a member having an aperture or apertures through which the filar suspension is threaded and a sleeve mounted on the member and movable relatively thereto for clamping the suspension between the member and the sleeve.

The novel features which I believe to be patentably characteristic of my invention will be definitely indicated in the claims appended hereto. The construction and mode of application of my novel clamping device will be understood from the following description taken in connection with the accompanying drawings, in which:

Figure 1 is a front elevation of a galvanometer in which the filar suspensions of the moving element are operatively clamped to their coöperating parts in accordance with my present invention; Fig. 2 is a side elevation upon an enlarged scale of the moving element of the instrument; Figs. 3 and 4 are enlarged detail views of the clamping device employed with the upper filar suspension of the instrument; Figs. 5, 6 and 7 are enlarged detail views of the clamping device employed with the lower filar suspension of the instrument; and Fig. 8 is a view of a modification.

The instrument illustrated in the drawings is a galvanometer of the well known type having a supporting base 9 upon which is mounted a supporting frame 10. The moving element of the instrument comprises two current carrying coils 12 secured to a shaft 13, together with a mirror 14 and an air damping vane 15 of the usual types also secured to the shaft. The coils 12 are positioned within the influence of magnetic fields produced in any well known manner, as for example by stationary permanent magnets or fixed field coils suitably mounted in the frame 10. The frame 10 also carries the usual instrument terminals 11. The moving element is operatively mounted in position by means of two filar suspensions 16 and 17. The upper filar suspension 16 is vertical and in effect constitutes the supporting suspension of the instrument. The lower filar suspension 17 is in the nature of a coiled control spring, and is hereinafter termed the helical filar suspension. These two filar suspensions are of the usual types employed with the moving element of instruments of the type to which my invention relates, and their construction and operation need not further be considered.

The vertical filar suspension 16 is clamped to the upper end of the shaft 13 and the helical filar suspension 17 is similarly clamped to the lower end of the shaft 13 in accordance with my present invention. The suspensions 16 and 17 serve in the well known manner to conduct the current to and from the coils 12 of the instrument. In the drawings, I have illustrated the shaft 13 as tubular, that is to say hollow, but it will be understood that the shaft itself may be solid and provided with tubular ends embodying the features of my present invention. The upper end of the shaft 13 is provided with a guide 18 to locate the suspensions 16 in the axis of the zero-shifting plug 23. It will be observed from Figs. 3 and 4 of the drawings that the guide 18 is formed by inwardly bending a substantially semi-circular extension of the tubular shaft until the extremity of the extension lies in the axis of the zero-shifting plug.

The shaft 13 is provided a short distance below its upper end with an aperture 19 through which the lower end of the filar suspension 16 is threaded. A sleeve 20 is mounted on the shaft and is adapted to be moved longitudinally along the shaft. Lugs 21 are provided for facilitating the longitudinal movement of the sleeve. The sleeve is first moved into the position shown in Fig. 3 of the drawings, and the filar suspension 16 is next threaded through the aperture 19. Upward movement of the sleeve then serves to securely clamp the lower end of the suspension between the shaft and the sleeve, as indicated in Fig. 4 of the drawings. A supporting member 22 (Fig. 2) is secured to the zero-shifting plug 23 of the instrument by a set-screw 24. The lower end of the supporting member 22 is fashioned like the upper end of the shaft 13, and a sleeve 20 is slidably mounted on the member 22 and serves to clamp the upper end of the filar suspension 16 to the member in exactly the same manner as the lower end of the suspension is clamped to the shaft 13.

In Fig. 8 of the drawings there is shown a slightly modified form of the clamping device, in which a tongue 35 is struck up from the tubular member 13', to form a guide to facilitate the threading of the suspension through the elongated aperture 19'. In this form of the device it will be understood that the clamping sleeve will bend the free end of the suspension upwardly, just as illustrated in Fig. 4 of the drawings.

The lower end of the shaft 13 is provided with two apertures 25 through which the upper end of the helical filar suspension 17 is threaded. The end of the helical suspension is threaded through these apertures so as to distort as slightly as possible the normal configuration of the coil or helix. It will of course be understood that the two apertures 25 need not be diametrically opposite, as illustrated in the present drawings, but may be arranged in any convenient manner to effect the clamping action in accordance with my present invention. A sleeve 26 is mounted on the lower end of the shaft 13 and has a projecting portion 27, shown in the drawings as substantially semi-circular, adapted when the sleeve is turned or rotated with respect to the shaft to securely clamp the upper end of the suspension 17 to the shaft. Fig. 5 of the drawings illustrates the upper end of the suspension 17 threaded through the apertures 25 with the projection 27 in its non-clamping position. In Fig. 6, the sleeve 26 has been turned until the projecting portion 27 securely clamps the free end of the suspension to the shaft. The sleeve 26 is provided with lugs 28 to assist in turning the sleeve into its clamping position. The lower end of the helical filar suspension 17 is similarly clamped to a relatively fixed part 29 of the instrument by means of the member 30 and coöperating sleeve 26'. While I have illustrated in Fig. 6 of the drawings the outer end of the suspension 17 clamped between the members 13 and 27, I consider it generally preferable to clamp the inner portion of the suspension, in order that the active length of the suspension may be unquestionably determined in an accurate and positive manner.

The filar suspensions ordinarily employed in instruments of the type to which my invention relates are usually metallic wires of filamentary character. Tungsten wire has been found to possess decidedly advantageous characteristics when employed as a filar suspension. It will be evident that any compression of a delicate filar suspension, such as would be produced by a clamping action, will quite materially alter the characteristics of the suspension in the vicinity of the point of clamping. For this reason I have found it impractical to have any portion of the filar suspension affected by the clamping action within the active or effective length of such suspension. Those skilled in the art will note that I have provided a clamping device which does not injure the suspension or impair its satisfactory operation in the instrument. With the clamping device which I have provided for the upper filar suspension, the effective length of the suspension is between the guides 18 of the tubular members of the clamping device. The clamping operation does not, accordingly, affect the active length of the suspension, since the clamping of the suspension is done at a point beyond the active length of the suspension, as determined by the guides 18. Similarly, the helical filar suspension is not affected by the clamping device which I have provided. The normal configuration of the coil or helix of the suspension is only slightly altered in threading the suspension through the coöperating apertures, and the clamped portion of the suspension does not alter the characteristics of the active length of the suspension.

It will be evident to those skilled in the art that the use of my novel and improved suspension clamp overcomes the difficulties heretofore experienced in soldering suspensions, where the heat of the soldering operation softens the suspension material, causing it to take a permanent set or show signs of fatigue due to torsional stress. My novel suspension clamp is easily renewed without the aid of a soldering-iron, and there is obviously no necessity for the use of acid or so-called non-corrosive soldering paste in changing the suspension. There is a decided advantage in being able to use the suspension wire uniformly hard throughout its active length and at the same time obtain good electrical contact, since this gives the most permanent zero possible with the material used for the suspension. My novel suspension clamp possesses these advantageous characteristics. The clamps are further extremely light, which is an important feature in the moving system, and yet they are sufficiently secured to sustain considerable weight without slipping.

What I claim as new and desire to secure by Letters Patent of the United States, is,—

1. The combination with the movable element of an electrical instrument, of a filar suspension for said element, a member having an aperture through which said suspension is threaded, and a sleeve mounted on said member and adapted by a rotary movement to clamp the suspension to the member.

2. The combination with the movable element of an electrical instrument, of a filar suspension for said element, a member having an aperture through which said suspension is threaded, and a sleeve rotatably mounted on said member and having a longitudinally extended portion for clamping the suspension to the member when the sleeve is turned on the member.

3. The combination with the movable element of an electrical instrument, of a filar suspension for said element, a tubular member having an inwardly projecting part adapted to act as a guide for said suspension, said member having an aperture through which the suspension is threaded, and a sleeve mounted on said member and adapted by a longitudinal movement thereof to clamp the suspension to the member.

4. The combination with the movable element of an electrical instrument, of a filar suspension for said element, a tubular member having an inwardly projecting guide for said suspension and an aperture through which the suspension is threaded, and a sleeve surrounding said tubular member and movable relatively thereto whereby said suspension can be securely clamped between said member and said sleeve.

5. The combination with the movable element of an electrical instrument, of a suspension for said element comprising a vertical filar suspension and a helical filar suspension, clamping means at each end of said vertical filar suspension for clamping said vertical filar suspension to a relatively fixed part of said instrument and to said movable element, each of said clamping means consisting of a tubular member having an aperture through which the filar suspension is threaded and a sleeve mounted on said member and adapted by a longitudinal movement to clamp the suspension to the member, and clamping means at each end of said helical filar suspension for clamping said helical filar suspension to a rotatively fixed part of said instrument and to said moving element, each of said last mentioned clamping means consisting of a tubular member having an aperture therein through which the filar suspension is threaded and a sleeve mounted on said member and adapted by a rotary movement to clamp the suspension to the member.

6. The combination with the movable element of an electrical instrument, of a filar suspension for said element, and clamping means at each end of said filar suspension for clamping the suspension to a relatively fixed part of said instrument and to said movable element, each of said clamping means consisting of a member having an aperture through which the filar suspension is threaded and, a sleeve mounted on said member and adapted by a rotary movement to clamp the suspension to the member.

7. The combination with the movable element of an electrical instrument, of a vertical filar suspension for said element, and clamping means at each end of said filar suspension for clamping the suspension to a relatively fixed part of the instrument and to said movable element, each of said clamping means consisting of a tubular member having an inwardly projecting guide for said suspension and an aperture through which the suspension is threaded and a sleeve slidably mounted on said member and adapted to clamp said suspension to the member.

8. The combination with the movable element of an electrical instrument, of a helical filar suspension for said element, and clamping means at each end of said filar suspension for clamping the suspension to a relatively fixed part of the instrument and to said movable element, each of said clamping means consisting of a member having an aperture through which the suspension is threaded and a sleeve mounted on said member and having an extended portion adapted by a rotary movement of the sleeve to clamp the suspension to the member.

In witness whereof, I have hereunto set my hand this twenty-first day of April, 1915.

ALVARADO L. R. ELLIS.

It is hereby certified that in Letters Patent No. 1,263,393, granted April 23, 1918, upon the application of Alvarado L. R. Ellis, of Lynn, Massachusetts, for an improvement in "Electrical Measuring Instruments," an error appears in the printed specification requiring correction as follows: Page 3, line 76, claim 5, for the word "rotatively" read *relatively;* and that the said Letters Patent should be read with this correction therein that the same may conform to the record of the case in the Patent Office.

Signed and sealed this 21st day of May, A. D., 1918.

[SEAL.]

R. F. WHITEHEAD,
*Acting Commissioner of Patents.*

Cl. 171—95.